(12) United States Patent
Xin et al.

(10) Patent No.: US 8,958,462 B2
(45) Date of Patent: Feb. 17, 2015

(54) ZERO CORRELATION ZONE SEQUENCES FOR COMMUNICATION SYSTEM

(75) Inventors: Yan Xin, Kanata (CA); Yongkang Jia, Ottawa (CA); Huan Wu, Ottawa (CA); Shouxing Qu, Groucester (CA); Arnold Sheynman, Northbrook, IL (US)

(73) Assignee: BlackBerry Limited, Ontario (CA)

( * ) Notice: Subject to any disclaimer, the term of this patent is extended or adjusted under 35 U.S.C. 154(b) by 284 days.

(21) Appl. No.: 13/537,398

(22) Filed: Jun. 29, 2012

(65) Prior Publication Data
US 2014/0003474 A1  Jan. 2, 2014

(51) Int. Cl.
*H04L 27/00* (2006.01)

(52) U.S. Cl.
USPC ............ 375/219; 375/316; 375/343; 375/295

(58) Field of Classification Search
CPC ................................................... H04J 13/0055
USPC .................................. 375/219, 316, 343, 295
See application file for complete search history.

(56) References Cited

U.S. PATENT DOCUMENTS

| 6,963,600 B1 | 11/2005 | Fan et al. |
|---|---|---|
| 2010/0080266 A1 | 4/2010 | Zhang et al. |
| 2012/0219017 A1 | 8/2012 | Zhang et al. |
| 2013/0129020 A1 | 5/2013 | Lakkis |

OTHER PUBLICATIONS

Tang, "Multiple Binary ZCZ sequence sets with good cross-correlation property based on complementary sequence sets", IEEE, Aug. 2010.*

IEEE P802.11ad/D5.0, Enhancements for Very High Throughput in the 60GHz Band, IEEE, Sep. 2011.

M.J.E. Golay, "Complementary Series", IRE Trans, Inform. Theory, pp. 644-652, 1961.

P.Z. Fan et al., "Class of binary sequences with zero correlation zone", IEEE Electronics Letter, pp. 777-779, 1999.

R. Appuswamy et al., "A new frame work for constructing mutually orthogonal complementary sets and ZCZ sequences", IEEE Trans. Inform. Theory, vol. 52, pp. 3817-3826, 2006.

Z. Zhang et al., "Z-complementary sets based on sequences with period and aperiodic zero correlation zone", EURASIP Journal on Wireless Communications and Networking, 2009.

Ying Li et al., "Extension of Golay's two pair construction for general complex complementary sequences", Information Theory and its Applications, 2008, ISITA 2008, Dec. 7, 2008, pp. 1-4.

(Continued)

*Primary Examiner* — Michael Neff

(57) ABSTRACT

The present disclosure provides for the construction and use of a set of Zero-Correlation-Zone (ZCZ) Concatenated Complementary Pair (CCP) sequences with zero-correlation-zone range greater than one or with zero-correlation-zone range equal to one and the sequence set size greater than two. Complementary pair sequences A and B are selected and, for each member of the set of ZCZ CCP sequences, sign sequences $p_A$ and $p_B$ are combined with the complementary pair sequences to form a member ZCZ CCP sequence of the set. A ZCZ CCP sequence modified by propagation over a communication channel may be identified by cross-correlation with ZCZ CCP sequences of the set. A set of sign sequences may be constructed by recursive expansion from an initial set or found by a computer search. The sequences may be used in a transceiver of a portable electronic device or other communication device.

22 Claims, 10 Drawing Sheets

(56) References Cited

OTHER PUBLICATIONS

Lung-Sheng Tsai et al., "Lower Bounds on the Correlation Property for OFDM Sequences with spectral-null constraints", IEE Transactions on Wireless Communications, vol. 10, No. 8, Aug. 1, 2011, pp. 2652-2659.

Extended European Search Report, EP13174431.0, Oct. 28, 2013.

* cited by examiner

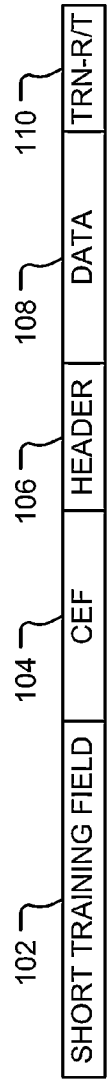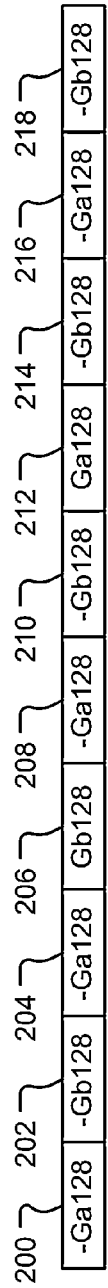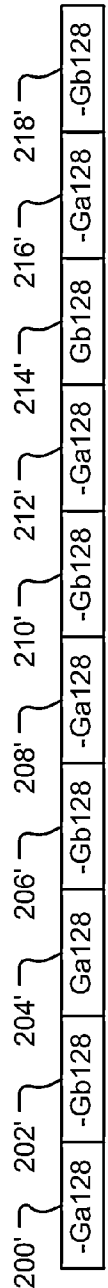

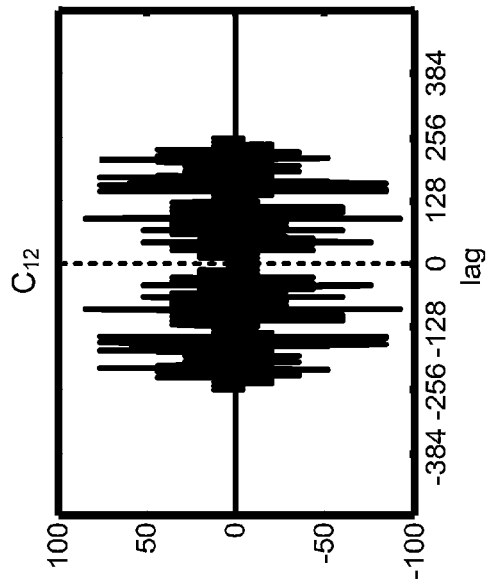
*FIG. 3A*
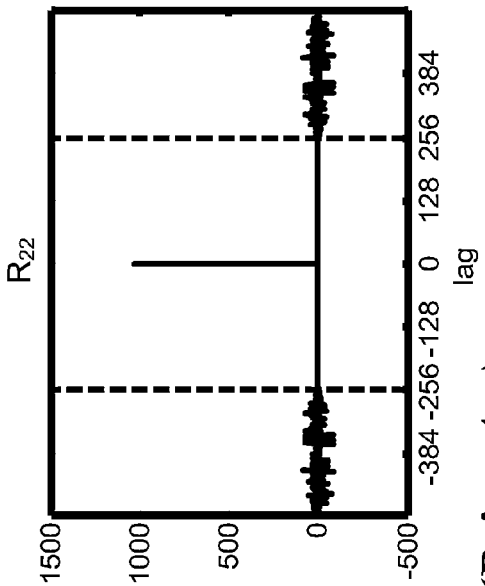
*FIG. 3B*
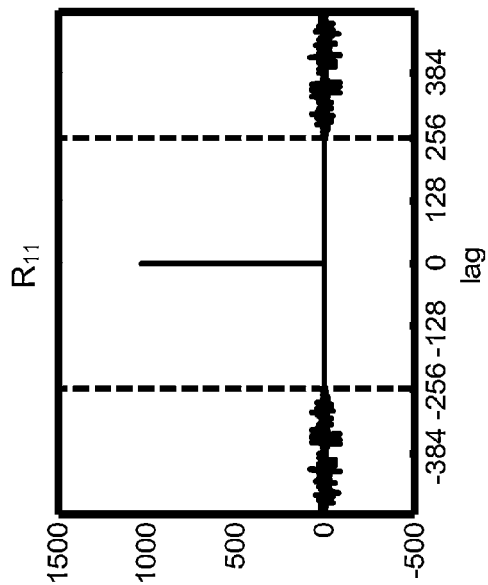
*FIG. 3C*
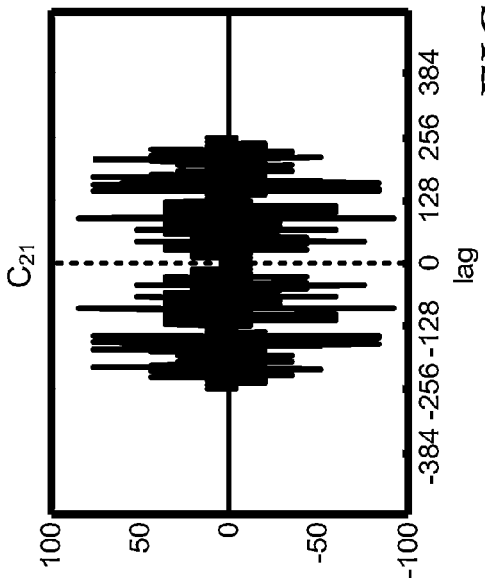
*FIG. 3D*
*FIG. 3 (Prior Art)*

FIG. 7A

$p_{L-1}^i B \mid p_0^i A \mid p_1^i B \mid p_2^i A \mid p_3^i B \mid \cdots \mid p_{L-2}^i A \mid p_{L-1}^i B \mid p_0^i A$

$p_{L-1}^j B \mid p_0^j A \mid p_1^j B \mid p_2^j A \mid p_3^j B \mid \cdots \mid p_{L-2}^j A \mid p_{L-1}^j B \mid p_0^j A$

ZERO CORRELATION ZONE SEQUENCES FOR COMMUNICATION SYSTEM

CROSS-REFERENCE TO RELATED APPLICATIONS

This application is related to co-pending U.S. patent application Ser. No. 13/537,429, filed on Jun. 29, 2012, which is hereby incorporated herein in its entirety.

BACKGROUND

Training sequences are widely used in wired and wireless communication systems in the form of well designed sequences or waveforms known to both the transmitter and the receiver. The training sequence (TS) is used mainly for the purpose of channel estimation, and may also carry other information (e.g., signalling or user information, etc.) that can be detected, typically blindly, on the receiver side. The ultimate goal for the design of the TS is to optimize the channel estimation and signal detection performance in the receiver for a given set of constraints (e.g., channel delay spread condition, types of information carried over, expected operating signal-to-noise ratio and transmitter/receiver complexity, etc.). The IEEE 802.11ad specification, which provides a standard for the emerging WLAN/WPAN at the 60 GHz frequency band, defines a training signal called channel estimation field (CEF). FIG. 1 shows the frame structure of a Physical layer Protocol Data Unit (PPDU) 100 defined in the IEEE 802.11ad specification. The frame structure includes a short training field (STF) 102, a channel estimation field (CEF) 104, a header 106, a data packet 108 and a beamforming receiver/transmitter training (TRN-R/T) field 110. An automatic gain control (AGC) field may also be included. The channel estimation field (CEF) 104 is used for channel estimation and detection of modulation types used in header and data packets when they are transmitted over a physical layer of a network. For example, the modulation type may be orthogonal frequency division multiplexing (OFDM) or single carrier (SC). The modulation type is associated with the physical layer (PHY) type.

FIG. 2 illustrates the CEF sequences defined in the IEEE 802.11ad specification for wireless local area networks. FIG. 2A shows the sequence for single carrier (SC) modulation and FIG. 2B shows the sequence for orthogonal frequency division multiplexing (OFDM) modulation. The CEF sequence for SC modulation consists of a prefix sequence 200 which is a part of the STF 102, followed by eight concatenated, alternating, 128-bit Golay complementary sequences, 202, 204, 206, 208, 210, 212, 214 and 216, and a postfix sequence 218. The sequences Ga128 and Gb128 form a Golay complementary pair. Each sequence is modulated by a sequence of signs (+ or −). The prefix and postfix sequences (shown as shaded blocks in the figures) are cyclic extensions of the eight concatenated sequences. Similarly, the CEF sequence for OFDM modulation, shown in FIG. 2B consists of a prefix sequence 200' which is also a part of the STF 102, followed by eight concatenated, alternating, 128-bit Golay complementary sequences, 202', 204', 206', 208', 210', 212', 214' and 216', and a postfix sequence 218'.

FIG. 3 shows graphs of periodic auto-correlation and cross-correlation functions of the CEF sequences specified in IEEE 802.11ad. FIG. 3A shows the periodic auto-correlation function $R_{11}$ of the first (SC) sequence. Due to the CEF format shown in FIG. 2, the range of time lags for evaluation of auto-correlation and cross-correlation is limited to −128 to 128. The auto-correlation is zero for time lags in the range −128 to 128, indicated by the zone between the dashed vertical bars in the figure, except for time lag zero. FIG. 3B shows the periodic cross-correlation function $C_{12}$ between the first (SC) sequence and the second sequence (OFDM). The cross-correlation is non-zero except for the single zero lag. Similarly, FIG. 3C shows the periodic cross-correlation function $C_{21}$ between the second sequence and the first sequence, and FIG. 3D shows the periodic auto-correlation function $R_{22}$ of the second sequence.

The CEF format in IEEE 802.11ad is designed for efficient channel estimation, but the format is not efficient for detecting the PHY type of a network's physical layer, since the cross-correlations, shown in FIG. 3B and FIG. 3C, have no zero-zone greater than a single lag.

It would be useful to provide improved training sequences that are efficient for both channel estimation and PHY type detection.

BRIEF DESCRIPTION OF THE DRAWINGS

Exemplary embodiments of the present disclosure will be described below with reference to the included drawings such that like reference numerals refer to like elements and in which:

FIG. 1 shows a known frame structure of a Physical layer Protocol Data Unit defined in IEEE specification 802.11ad;

FIG. 2 shows the related known channel estimation fields (CEF's).

FIG. 3 shows graphs of periodic auto-correlation and cross-correlation functions of the known CEF sequences;

FIG. 7 is a diagrammatic representation of ZCZ CCP sequences, in accordance with exemplary embodiments of the disclosure;

FIG. 12 shows CEF fields containing ZCZ CCP sequences in accordance with exemplary embodiments of the disclosure;

DETAILED DESCRIPTION

Figure 4A:
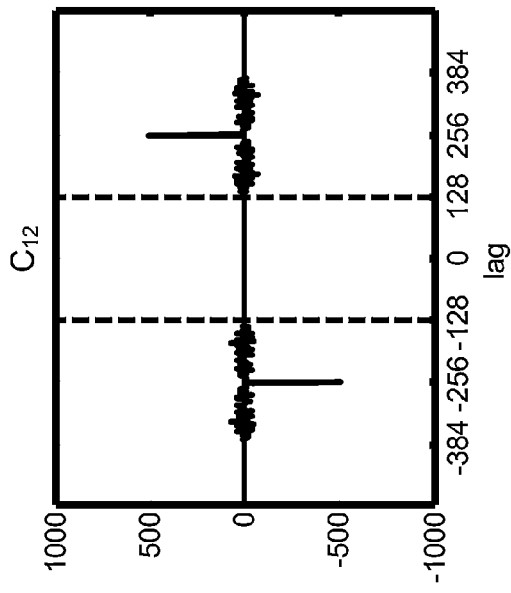
FIG. 4 shows graphs of exemplary periodic auto-correlation and cross-correlation functions of a pair of exemplary Zero-Correlation-Zone (ZCZ) concatenated complementary pair (CCP) sequences, in accordance with some embodiments of the present disclosure.
Figure 4B:
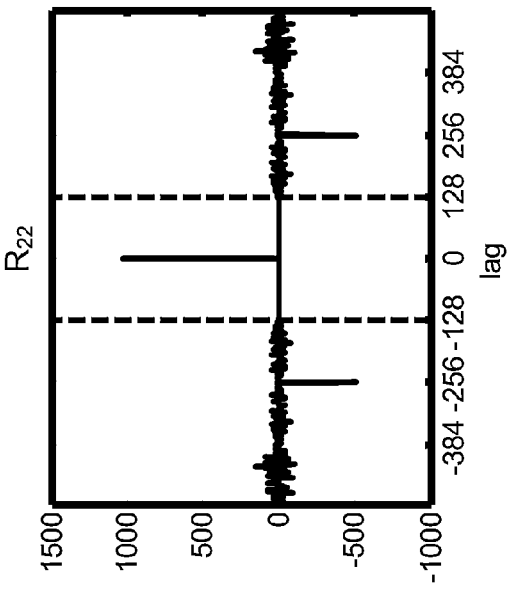
Figure 4C:
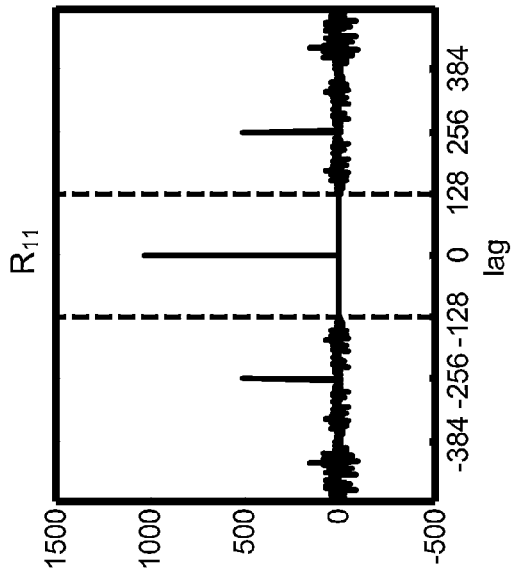
Figure 4D:
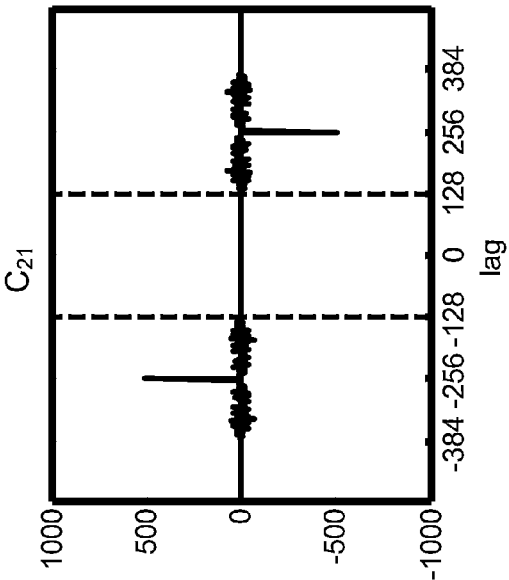

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

The present disclosure relates to the construction and use of a set of Zero-Correlation-Zone (ZCZ) concatenated complementary pair (CCP) sequences having a zero correlation zone greater than one or having a zero correlation zone equal to one and the set size greater than two. Such sequences have applications in communication systems as training signals for estimating a channel response and as information signals.

A set of sequences have a ZCZ greater than one if the auto-correlation of sequences is zero for time lags in a range extending greater than one lag and the cross-correlation between any two sequences in the set is zero for time lags in a range extending greater than one lag.

One aspect of the present disclosure relates to a mobile electronic device that is operable to identify a transmitted training sequence of a set of training sequences in a training sequence field in a signal frame that is propagated over a communication channel. The mobile electronic device includes a receiver operable to receive the propagated training sequence. It also includes a first Zero-Correlation-Zone (ZCZ) Concatenated Complementary Pair (CCP) sequence generator, operable to generate a first ZCZ CCP sequence, at least one second ZCZ CCP sequence generator, each operable to generate a second ZCZ CCP sequence, a first correlator, operable to produce a first cross-correlation between the first ZCZ CCP sequence and the propagated training sequence and at least one second correlator, each operable to produce a second cross-correlation between a sequence of the at least one second ZCZ CCP sequence and the propagated training sequence. The receiver also includes a comparator, operable to identify the transmitted training sequence by comparing the first cross-correlation and the at least one second cross-correlation.

In one embodiment the first and second ZCZ CCP sequences are selected from a set of sequences having a zero correlation zone greater than one.

In a further embodiment, the first and second sequences are selected from a set of more than two ZCZ CCP sequences. In this embodiment, the sequences may have a zero correlation zone equal to one.

A further aspect of the present disclosure relates to a mobile electronic device that is operable to transmit a training sequence of a set of training sequences in a training sequence field in a signal frame that is propagated over a communication channel. The mobile electronic device includes a transmitter and Zero-Correlation-Zone (ZCZ) Concatenated Complementary Pair (CCP) sequence generator.

In one embodiment the ZCZ CCP sequences are selected from a set of sequences having a zero correlation zone greater than one.

In a further embodiment, the first and second sequences are selected from a set of more than two ZCZ CCP sequences. In this embodiment, the sequences may have a zero correlation zone equal to than one.

Various methods are presented for construction of ZCZ CCP sequence having the desired properties.

FIG. 4 shows graphs of periodic auto-correlation and cross-correlation functions of a pair of exemplary Zero-Correlation-Zone (ZCZ) concatenated complementary pair (CCP) sequences in accordance with the present disclosure. FIG. 4A shows the periodic auto-correlation function $R_{11}$ of the first sequence. The auto-correlation is zero for time lags in the range −128 to 128, indicated by zone between the dashed vertical bars in the figure, except for time lag zero. FIG. 4B shows the periodic cross-correlation function $C_{12}$ between the first sequence and the second sequence. In contrast to prior approaches, the cross-correlation is zero for time lags in the range −128 to 128, indicated by zone between the dashed vertical bars in the figure. Similarly, FIG. 4C shows the periodic cross-correlation function $C_{21}$ between the second sequence and the first sequence, and FIG. 4D shows the periodic auto-correlation function $R_{22}$ of the second sequence.

In the example shown in FIG. 4, the first and second sequences, each of length 1024, are composed of 8 concatenated blocks of length 128. However, other sequences of various lengths may be used, producing zero correlation zones of various sizes. An example technique for generating ZCZ sequences is described below.

Figure 5:
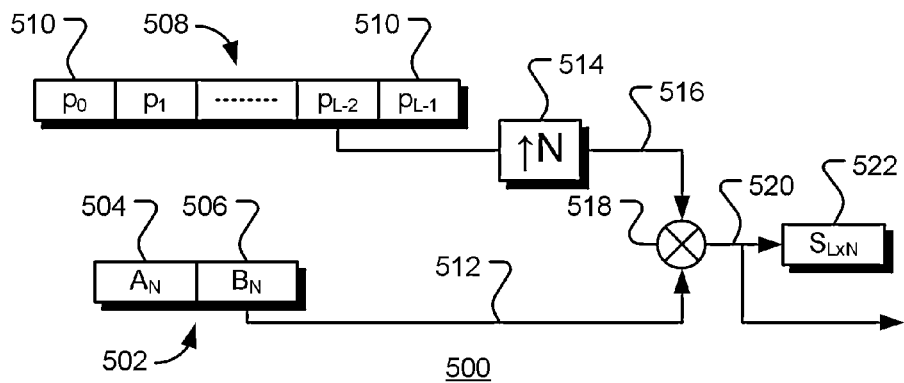
FIG. 5 is a block diagram of a ZCZ CCP sequence generator, in accordance with exemplary embodiments of the disclosure.

FIG. 5 is a block diagram of a ZCZ CCP sequence generator 500 in accordance with exemplary embodiments of the disclosure. The ZCZ CCP sequence generator 500 includes a first circular buffer 502, containing a concatenation of two complementary pair sequences 504 and 506, and a second buffer 508. The second buffer 508 contains a sign sequence with elements 510. The length of each sequence 504 and 506 of the complementary pair sequences is denoted by N. In operation, the first buffer 502 is accessed in sequence at a first rate to produce a complementary pair sequence 512. The second buffer 508 is accessed at a rate N time slower and the accessed values are passed to up-sampler 514 where they are repeated at the first rate to produce a modulation signal 516. The modulation signal 516 is used to modulate the complementary pair sequence 512 in modulator 518 and produce the final Zero Correlation Zone (ZCZ) sequence 520. The modulation process is described below. Optionally, the ZCZ sequence 520 may be stored in a memory 522 for future use.

Referring again to FIG. 5, the sign sequence stored in buffer 508 is one of a set of two or more sign sequences. Each sign sequence in the set produces a corresponding ZCZ CCP sequence. For example the sign sequence $p^i=(p_0^i, \ldots, p_{L-1}^i)$ will modulate complementary pair sequences to produce the ZCZ CCP sequence $S^i=(p_0^i A, p_1^i B, \ldots, p_{L-2}^i A, p_{L-1}^i B)$. The sign $p_1^i \in \{-1,+1\}$ multiplies the $i^{th}$ concatenated sequence of the $l^{th}$ member of a sequence set and $l=0, \ldots, L-1$ (L is a even number). All the sequences in the set use the same pair of complementary sequences A and B of length N. These sequences are concatenated alternately along with the corresponding signs for each A or B, $p_l^i$ or $p_l^j$. Such sequences $s^i$ are called concatenated complementary pair (CCP) sequences.

Figure 6:
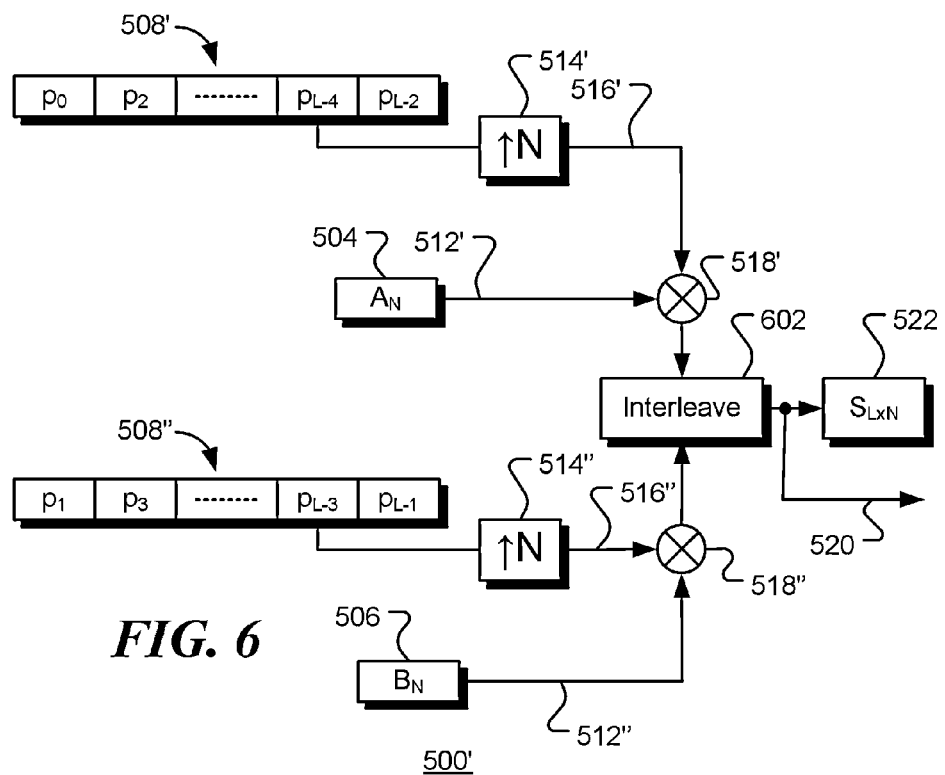
FIG. 6 is a block diagram of a further ZCZ CCP sequence generator, in accordance with exemplary embodiments of the disclosure.

It will be apparent to those of ordinary skill in the art that the ZCZ CCP sequence $S^i=(p_0^i A, p_1^i B, \ldots, p_{L-2}^i A, p_{L-1}^i B)$ may be constructed in different ways. An example of an alternative construction is shown in FIG. 6. Such alternative constructions are considered to be equivalent to the exemplary constructions disclosed herein.

FIG. 6 is a block diagram of a ZCZ CCP sequence generator 500' in accordance with further exemplary embodiments of the disclosure. The ZCZ CCP sequence generator 500' includes a first circular buffer 504, containing the first sequence A of a complementary pair and a second circular buffer 506 containing the second sequence B of a complementary pair. Buffer 508' contains the even elements of a sign sequence and buffer 508" contains the odd elements of the sign sequence. The odd and even parts of the sign sequence are denoted, respectively, as $p_A^i = (p_0^i, p_2^i, \ldots, p_{L-2}^i)$ and $p_B^i = (p_1^i, p_3^i, \ldots, p_{L-1}^i)$. The original sign sequence is recovered by interleaving the elements of $p_A^i$ and $p_B^i$, so that $p^i = (p_{A,0}^i, p_{B,0}^i, p_{A,3}^i, p_{B,3}^i, \ldots, P_{A,L/2-1}^i, p_{B,L/2-1}^i)$.

The length of the complementary pair sequences A and B is denoted by N. In operation, the first buffer 504 is accessed sequentially at a first rate to produce sequence 512' of the complementary pair of sequences. The second buffer 506 is accessed sequentially at the same rate to produce a sequence 512" of the complementary pair. The sign buffers 508' and 508" are accessed at a rate N time slower and the accessed values are passed to up-samplers 514' and 514", where they are repeated at the first rate to produce modulation signals 516' and 516". The modulation signals are used to modulate the sequences 512' and 512" in modulators 518' and 518", respectively.

The sequence generators shown in FIG. 5 and FIG. 6, and their equivalents, may be implemented in hardware using custom logic, or on a programmable logic device such as a field programmable gate array (FPGA). Alternatively, the generators may be implemented on a programmable computer. The buffers may be implemented as memory arrays.

In a further embodiment, the sequence generator may be implemented as a sequentially accessed memory that stores one or more complete ZCZ CCP sequences.

It is noted that modulated sequences may be denoted as $p_A^i \otimes A = (p_0^i A, p_2^i A, \ldots, p_{L-2}^i A)$ and $p_B^i \otimes B = (p_1^i B, p_3^i B, \ldots, p_{L-1}^i B)$, where $\otimes$ denotes the Kronecker tensor product. Thus, the sequence $s^i = (p_0^i A, p_1^i B, \ldots, p_{L-2}^i A, p_{L-1}^i B)$ can be obtained by interleaving blocks of length N of the first Kronecker tensor product, $p_A^i \otimes A$, and the second Kronecker tensor product, $p_B^i \otimes B$. Accordingly, the resulting modulated sequences are interleaved in interleave module 602 to produce the final ZCZ CCP sequence 520. Optionally, the ZCZ CCP sequence 520 may be stored in a memory 522 for future use.

FIG. 7 is a diagrammatic representation of exemplary concatenated complementary pair (CCP) sequences produced by a ZCZ CCP sequence generator. FIG. 7A shows the sequence generated using the $i^{th}$ sign sequence of the set $p^i = (p_0^i, \ldots, p_{L-1}^i)$ and stored in a memory 522, while FIG. 7B shows the sequence generated using the $j^{th}$ sign sequence of the set, $p^j = (p_0^j, \ldots, p_{L-1}^j)$ stored in a memory 522'. The shaded entries depict periodic continuations of the sequence.

Figure 8:
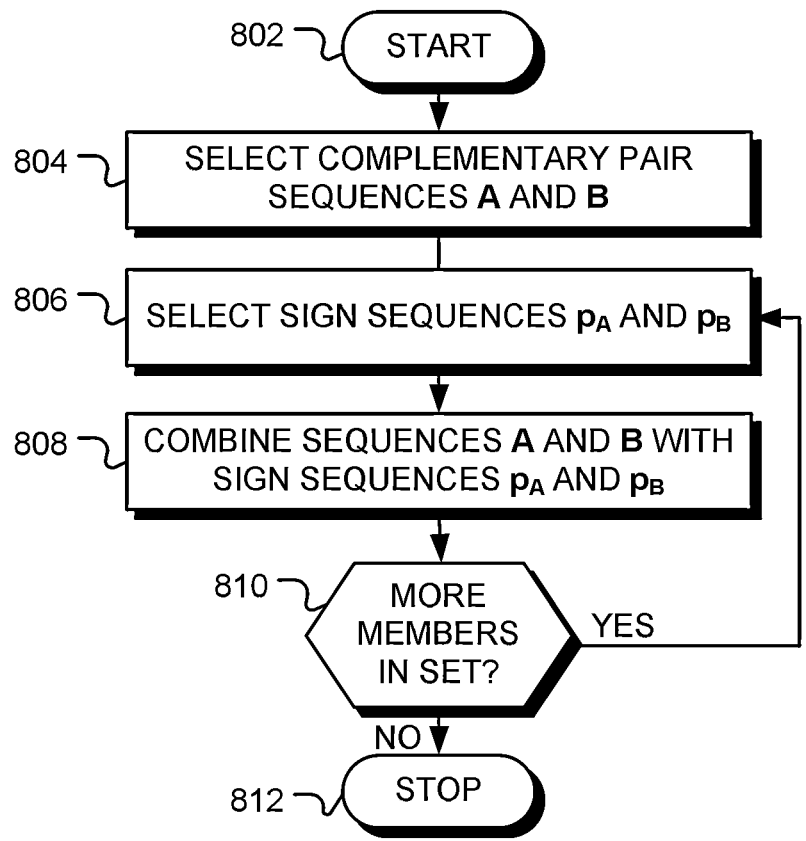
FIG. 8 is a flow chart of a method for constructing a set of ZCZ CCP sequences, in accordance with exemplary embodiments of the disclosure.

FIG. 8 is a flow chart 800 of a method for constructing a set of Zero-Correlation-Zone (ZCZ) concatenated complementary pair (CCP) sequences of length L×N with zero-correlation-zone range greater than one or with zero-correlation-zone range equal to one and the set size greater than two. Following start block 802 in FIG. 8, complementary pair sequences A and B of length N are selected at block 804. At block 806 ZCZ sequences sign sequences $p_A$ and $p_B$ of length L/2 are selected. At block 808, the sign sequences are combined with the complementary pair sequences A and B to form the member ZCZ CCP sequence having a zero-cross-correlation-zone range greater than one or zero-correlation-zone range equal to one and the set size greater than two. At decision block 810, a check is made to determine if there are more ZCZ CCP sequences of the set to be constructed. If so, as depicted by the positive branch from decision block 810, flow returns to block 806. In this manner, blocks 806 and 808 are implemented for each member of the set of sequences. Once all sequences have been generated, as depicted by the negative branch from decision block 810, the process terminates at block 812.

In one embodiment of the disclosure, the sign sequences $p_A$ and $p_B$ are combined with the complementary pair sequences A and B of length N by forming a first Kronecker tensor product $p_A \otimes A$ and a second Kronecker tensor product $p_B \otimes B$, and interleaving blocks of length N of the first and second Kronecker tensor products.

In a further embodiment, the sign sequences $p_A$ and $p_B$ are combined with the complementary pair sequences A and B by modulating the sequence A by a sign of the sign sequence $p_A$ for each sign of the sign sequence $p_A$, modulating the sequence B by a sign of the sign sequence $p_B$ for each sign of the sign sequence $p_B$, and interleaving the sign modulated sequence A with the sign modulated sequence B.

In a still further embodiment, the sign sequences $p_A$ and $p_B$ are combined with the complementary pair sequences A and B by alternately concatenating the complementary pair sequence A modulated by a sign of the sign sequence $p_A$ and the complementary pair sequence B modulated by a sign of the sign sequence $p_A$.

Other methods of combining the sign sequences $p_A$ and $p_B$ with the complementary pair sequences A and B will be apparent to those of ordinary skill in the art.

For simplicity of notation, "−" and "+" may be used to represent "−1" and "+1" respectively in the sequel.

It is noted that the CEFs defined in the IEEE 802.11ad specification can be considered as the sequences constructed with sign sequence $p^{SC} = (-,-,+,-,-,+,-,-)$ or $p^{OFDM} = (-,+,-,-,-,-,+,-)$; and a pair of binary Golay complementary sequences A and B with length N=128. However, it can be seen from FIG. 3B and FIG. 3C, that these CCP sequences do not yield zero correlation zones in the cross-correlations between the sequences. This property can degrade the sequence detection performance.

Auto- and Cross-Correlation. For two binary sequences $S^i = (s_3^i, s_1^i, \ldots, s_{Ns-1}^i)$ and $S^j = (s_0^j, s_1^j, \ldots, s_{NB-1}^j)$ where $s_n^i, s_n^j \in \{-1, +1\}$, n=0, 1, …, Ns−1, the following correlation functions are defined:

the aperiodic cross-correlation function:

$$C_{S^i S^j}^a(k) = \sum_{n=max(0,-k)}^{min(Ns-1-k,\ Ns-1)} s_n^i s_{n+k}^j \text{ for } k = 0, \pm 1, \ldots, \pm(Ns-1) \quad (2.1)$$

the aperiodic autocorrelation function:

$$R_{S^i}^a(k) = \sum_{n=max(0,-k)}^{min(Ns-1-k,\ Ns-1)} s_n^i s_{n+k}^i \text{ for } k = 0, \pm 1, \ldots, \pm(Ns-1) \quad (2.2)$$

the periodic cross-correlation function:

$$C_{S^i S^j}(k) = \sum_{n=0}^{Ns-1} s_n^i s_{(n+k) mod Ns}^j \text{ for } k = 0, +1, \ldots, +(Ns-1) \quad (2.3)$$

the periodic autocorrelation function:

$$R_{s^i}(k) = \sum_{n=0}^{N_s-1} s_n^i s_{(n+k) \bmod N_s}^i \text{ for } k = 0, \pm 1, \ldots, \pm(N_s - 1) \quad (2.4)$$

Complementary Pairs. A pair of complementary sequences A and B of length Ns (such as Golay sequences, for example) satisfy:

$$R_A^a(k) + R_B^a(k) = \begin{cases} 2N, & \text{for } k = 0 \\ 0 & \text{others} \end{cases} \quad (2.5)$$

That is, for two sequences forming a complementary pair, the sum of the aperiodic auto-correlations of the sequences is zero except at zero lag. It is noted that the periodic auto-correlation of the complementary sequences also have the property (2.5).

Sequences with zero correlation zones. Binary sequences with zero correlation zones are known to those of ordinary skill in the art. However, in the present disclosure, new ZCZ sequences are obtained by using selected sign sequences to modulate concatenated complementary pair sequences. For simplicity, and without loss of generality, only the symmetrical case is described in what follows. In a set of ZCZ sequences of length Ns, the periodic autocorrelation of an arbitrary sequence $s^i$ satisfies:

$$R_{s^i}(k) = 0 \text{ for } k = [-N_1, \ldots, N_1] \text{ except for } k = 0 \quad (2.6)$$

and the periodic cross-correlation between any two arbitrary sequences $S^i$ and $S^j$ in a set of ZCZ sequences satisfies:

$$C_{s^i s^j}(k) = 0 \text{ for } k = [-N_2, \ldots, N_2] \quad (2.7)$$

where $1 \leq N_1 < Ns$ and $0 \leq N_2 < Ns$. $N_1$ and $N_2$ define the extent of the 'zero zones'. The number of ZCZ sequences in a set is denoted as M. Such sequences are denoted as the (Ns, $N_1$, $N_2$, M) sequences and ZCZ sequences constructed by CCP sequences are denoted as (N·L, $N_1$, $N_2$, M) CCP sequences, where N is the length of the constituent complementary sequences and L is the number of the complementary sequences in the main sequence (excluding the prefix and postfix).

Equation (2.7) indicates that the cross-correlation is zero for shifts up to $N_2$ symbols. A subset of (Ns, $N_1$, $N_2$, M) ZCZ sequences is called a $ZCZ^0$ sequence set when the cross-correlation of any pair of sequences in the set equals zero only at zero shift, i.e. $N_2 = 0$.

The periodic autocorrelation and cross-correlation of the sequences $s^{SC}$ and $s^{OFDM}$ used as CEF in IEEE 802.11ad (as shown in FIG. 2) have the following properties (shown graphically in FIG. 3):

(1) $R_{s^{SC}}(k) = R_{s^{OFDM}}(k)$ (2.8)

$$= \begin{cases} 8 \times 128 & \text{for } k = 0 \\ 0 & \text{for } k = -128, \ldots, -1 \text{ and } k = 1, \ldots, 128 \end{cases}$$

(2) $C_{s^{SC} s^{OFDM}}(0) = 0.$ (2.9)

Thus, these CEF sequences are $ZCZ^0$ sequences in which Ns=L·N=8×128, $N_1$=N=128, $N_2$=0 and M=2.

Due to its perfect autocorrelation property (equation 2.8), i.e., the autocorrelation function is a delta function for k being within [−128,128], the current IEEE 802.11ad CEF ensures an optimal estimation in a sense of maximizing signal-to-noise (and/or interference) ratio in channel estimation for a channel with up to 129 channel taps at the chip rate. This accommodates any channels with a delay spread up to 73 nanoseconds. The channel estimation can be obtained by cross-correlating the main sequence $S^{SC}$ or $S^{OFDM}$ with the received samples of the CEF (after de-rotation, if the CEF is n/2-rotated before transmission), $x_k$. Two hypotheses $h_{SC}(n)$ and $h_{OFDM}(n)$ are calculated as:

$$h_{SC}(n) = \sum_{k=0}^{8 \times 128 - 1} S_k^{SC} \cdot x_{n_0 + n + k} \quad (2.10)$$

$$h_{OFDM}(n) = \sum_{k=0}^{8 \times 128 - 1} S_k^{OFDM} \cdot x_{n_0 + n + k} \quad (2.11)$$

Where $n_0$ is the timing offset to indicate the start chip sample of CEF and n=0, 1, ..., 256.

The PHY type can be detected by comparing the metrics derived from $h_{SC}(n)$ and $h_{OFDM}(n)$, for example, the maximum power of a channel tap from both estimated channel impulse responses, or the energy (integration of the power of channel taps) from a certain window in $h_{SC}(n)$ and $h_{OFDM}(n)$, etc. The channel estimation is either $h_{SC}(n)$ and $h_{OFDM}(n)$ depending on which metric is the winner.

However, while the current CEF specified in IEEE 802.11ad is effective for channel estimation, it can be improved for PHY type detection even if the channel has a single tap (as is the case for pure line-of-sight (LOS) propagation). When a channel has multiple delayed taps, detection performance will be further degraded due to the fact that the cross-correlation between the received samples and $S^{SC}$ (or $S^{OFDM}$) is not equal to zero at any shift, including at zero shift.

In accordance with one aspect of the present disclosure, the CEF specified in IEEE 802.11ad is modified to provide optimal PHY type detection for channels with up to 129 channel taps while keeping the length and the format of the current CEF unchanged from that specified in IEEE 802.11ad. This is achieved by using ZCZ (128×8, 128, 128, ) CCP sequences for $S^{SC}$ and $S^{OFDM}$, so that the autocorrelations of both $S^{SC}$ and $S^{OFDM}$ sequences are the delta function and their cross-correlation equals zero for all shifts within [−128, 128].

More generally, when a training sequence is used both for channel estimation and signalling, (Ns, $N_1$, $N_2$, M) ZCZ CCP sequences may be used to provide optimal channel estimation and signal detection in a communication system.

Figure 9:
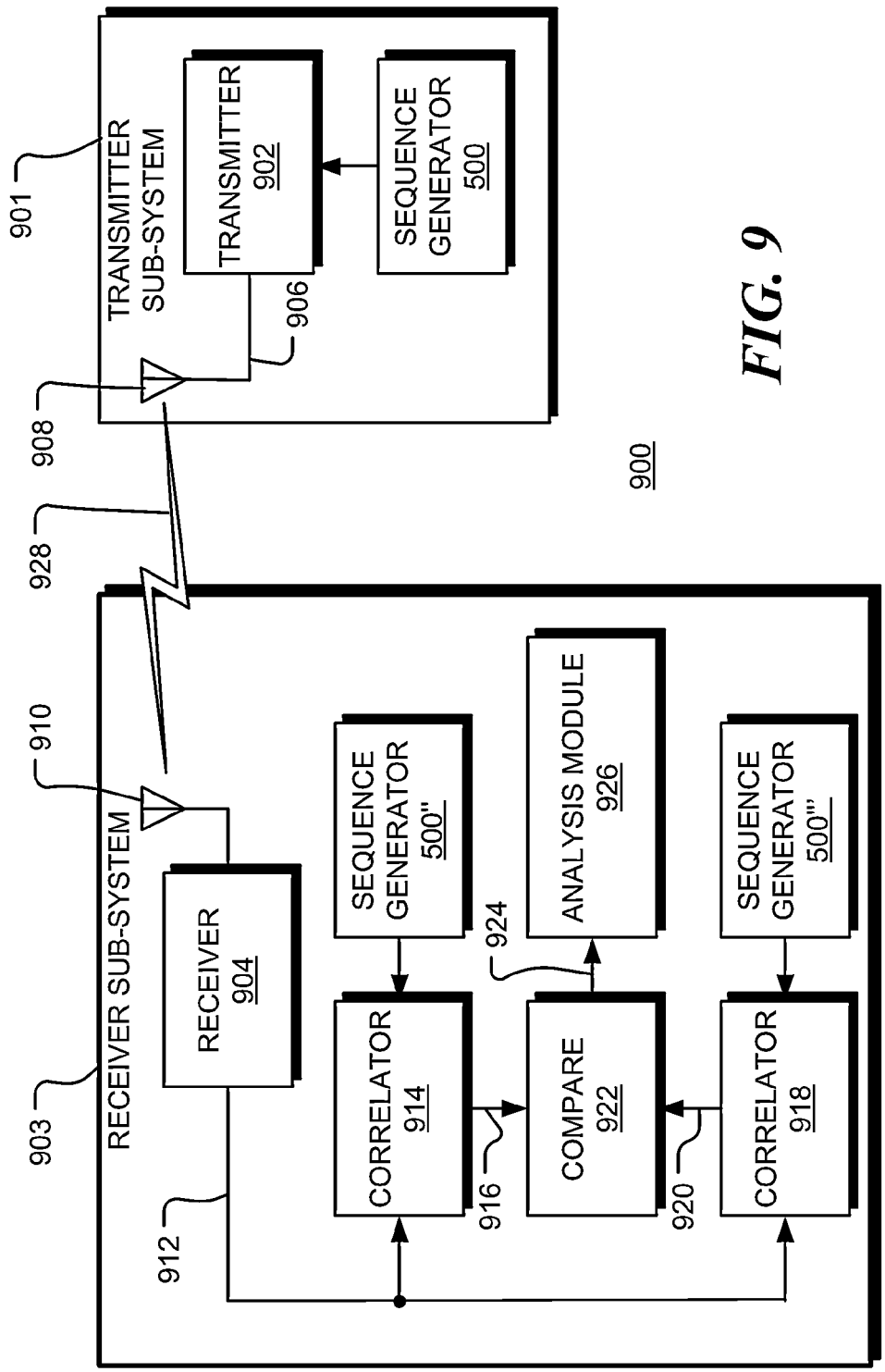
FIG. 9 is a block diagram of a communication system, in accordance with exemplary embodiments of the disclosure.

FIG. 9 is a block diagram of a wireless communication system 900, in accordance with exemplary embodiments of the disclosure. The system 900 includes a transmitter sub-system 901 with transmitter 902 and a receiver sub-system 903 with receiver 904. In general, a communication device may include transmitter 902 or receiver 904, or both. The transmitter sub-system 901 includes a sequence generator 500 operable to pass a training sequence 906, selected from a set of training sequences, to an antenna 908. The training sequence is propagated over a communication channel 928 to the receiver sub-system 903, where it is received by antenna 910 or receiver 904. The receiving transceiver 904 is configured to identify the transmitted training sequence from the received signal 912. In this example, the receiving transceiver 904 includes two ZCZ CCP sequence generators 500" and 500'", which is appropriate when the sequence to be detected is one selected from a pair of sequences. However, in general, the sequence to be detected may be one of a set of two or more sequences and one sequence generator is used for each possible sequence. In this example, the received signal 912 is assumed to have contained one of a pair of sequences when transmitted, but the received signal may be modified by the properties of the transmission channel. The received signal 912 is correlated, in correlator 914, with a sequence produced by the first sequence generator 500'' to produce a first correlation signal 916. It is also correlated, in correlator 918, with a sequence produced by the second sequence generator 500''' to produce a second correlation signal 920. The first and second correlation signals 916 and 920 are compared in comparator 922 to produce an output 924 that identifies which sequence was embedded in the received signal 912. The output may be used for channel impulse response (CIR) estimation or for type detection in analysis module 926.

The first ZCZ CCP sequence generator 500'' generates a first sequence comprising a plurality of concatenated sub-sequences, each sub-sequence being a sequence A of a complementary pair, modulated by a sign of a first sign sequence $p_A^{(1)}$, alternately concatenated with a sequence B of the complementary pair, modulated by a sign of a second sign sequence $p_B^{(1)}$. Similarly, the second ZCZ CCP sequence generator 500''' generates a second sequence comprising a plurality of concatenated sub-sequences, each sub-sequence being the sequence A of the complementary pair, modulated by a sign of a third sign sequence $p_A^{(2)}$, alternately concatenated with the sequence B of the complementary pair, modulated by a sign of a fourth sign sequence $p_B^{(2)}$. The first correlator 914 produces a first cross-correlation 916 between the first ZCZ CCP sequence and the propagated training sequence 912 and the second correlator 918 produces a second cross-correlation 920 between the second ZCZ CCP sequence and the propagated training sequence 912. The comparator 922 identifies the transmitted training sequence by comparing the first cross-correlation and the second cross-correlation.

In a further embodiment, the first and second ZCZ CCP sequences may be stored in a memory and accessed by the sequence generators as needed.

It will be apparent to those of ordinary skill in the art that the various elements shown in FIG. 9, including the correlators and sequence generators, may be implemented in hardware or software or a combination thereof.

In one application, the sequence to be transmitted is selected to indicate the type of modulation used or the PHY type of the transmission.

EXAMPLE I

If, for example, that the PHY type is SC and the test signal specified in 802.11ad is used. The hypotheses $h_{SC}(n)$ and $h_{OFDM}(n)$ are calculated as in equations (2.10) and (2.11), respectively. To identify the PHY type, peak detection is performed by comparing the peaks of $h_{SC}(n)$ and $h_{OFDM}(n)$. In order to exclude the impact of possible inter-symbol interference (ISI) on the detection results, a peak of $h_{SC}(n)$ and $h_{OFDM}(n)$ is searched for 128≤n≤256 only. It is desirable that the difference between the peak values of estimated $h_{SC}(n)$ and $h_{OFDM}(n)$ be as large as possible.

Scenario 1: If the channel corresponds to a single channel tap without noise, the estimated hypotheses $h_{SC}(n)$ and $h_{OFDM}(n)$ correspond to the plots shows in FIG. 3A and FIG. 3B, respectively. The highest peak values of the estimated channel are $h_{SC}(129)=1025$ and $h_{OFDM}(220)=84$.

Figure 10A:
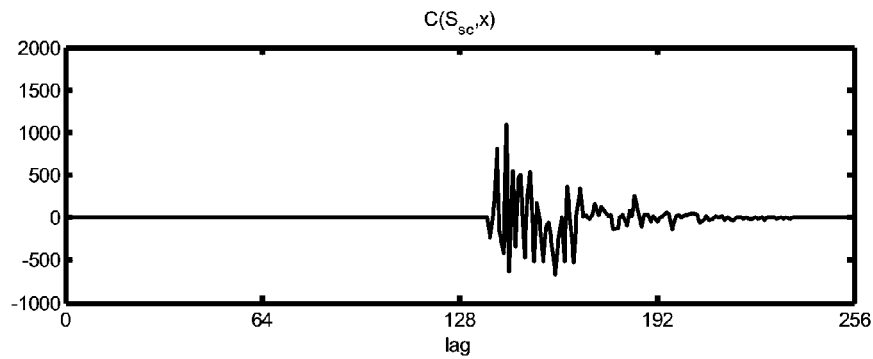
FIG. 10 shows plots of cross-correlations between a received training sequence and known CCP sequences for exemplary propagation paths, in accordance with exemplary embodiments of the disclosure.
Figure 10B:
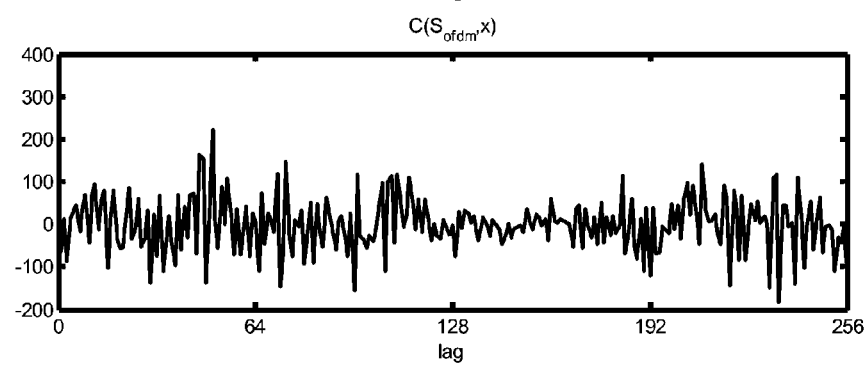

Scenario 2: If the channel corresponds to a multipath (128 channel taps with random amplitude decayed exponentially) without noise, the estimated hypotheses $h_{SC}(n)$ and $h_{OFDM}(n)$ correspond to the plots shows in FIG. 10. The hypothesis $h_{SC}(n)$ is shown in FIG. 10A and the hypothesis $h_{OFDM}(n)$ is shown in FIG. 10B. The peak values, for lags in the range [128,256], of the estimated channel are $h_{SC}(143)=1086$ and $h_{OFDM}(209)=142$. Thus, it is more difficult to distinguish between the hypotheses.

Figure 11A:
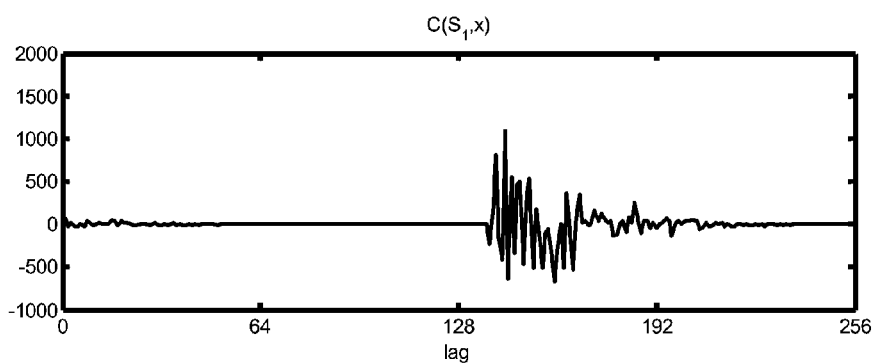
FIG. 11 shows plots of cross-correlations between a received training sequence and ZCZ CCP sequences for exemplary propagation paths, in accordance with exemplary embodiments of the disclosure.
Figure 11B:
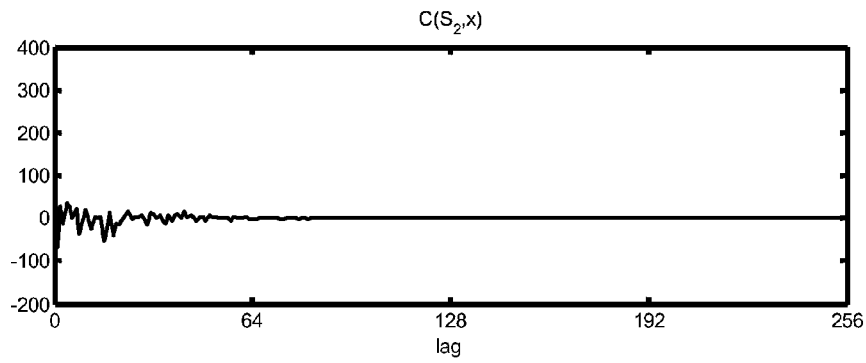

In contrast, FIG. 11 shows the corresponding plot when ZCZ CCP sequences are used in accordance with some embodiments of the present invention. The hypothesis $h_{SC}(n)$ is shown in FIG. 11A and the hypothesis $h_{OFDM}(n)$ is shown in FIG. 11B. The peak values, for lags in the range [128,256], of the estimated channel are $h_{SC}(143)=1086$ and $h_{OFDM}(-)=0$. Thus, in the absence of noise, the PHY type is identified with certainty.

Construction of a set of ZCZ CCP sequences [$S^i$] can be summarized as:
1) selecting a pair of complementary sequences A and B,
2) designing the corresponding sign sequences {$p^i$}, and
3) applying {$p^i$} to the complementary sequences.

The following conditions are sufficient for construction of ZCZ (N×L,N,N,M) CCP sequences, in which N and L are the length of each sequence of the complementary pair sequences and the number of concatenated such sequences, respectively. M is the number of CCP sequences in a ZCZ set.

An exemplary method for the construction of ZCZ (N×L, N,N,M) CCP sequences, in which N and L are the length of the complementary sequences and the number of concatenated such sequences respectively is described below. M is the number of CCP sequences in a ZCZ set.

The odd and even parts of the sign sequence are denoted as $$p_A^i = \{p_0^i, p_2^i, \ldots, p_{L-2}^i\}, p_B^i = \{p_1^i, p_3^i, \ldots, p_{L-1}^i\}.$$

The first desired property is that autocorrelation of $S^i$ is a delta function for shifts in the range [−N,N]. This is satisfied provided that the each sign sequence satisfies a first condition:

Condition I.

For the sign sequences $p_A$ and $p_B$ of the same set member i, the cross-correlation satisfies $$C_{p_A^i, p_B^i}(0) = C_{p_A^i, p_B^i}(-1) = 0 \quad (3.1)$$

Thus, the sign sequences $p_A$ and $p_B$ of the same set member i, are uncorrelated at zero lag and the cross-correlation of sign sequences $p_A^i$ with the sign sequence $p_B^i$ is zero at lag=−1. The sign sequences $p_A$ and $p_B$ have length L/2.

The condition (3.1) implies that the length L of the sign sequence is multiple of 4. The second desired property is that, for any two CCP sequences $S^i$ and $S^j$ in the set, the cross-correlation between $S^i$ and $S^j$ is equal zero for all shifts in the range [−N,N]. This condition is satisfied provided that the sign sequences satisfy a second condition:

Condition II:

For each i and j in the set of sequences, with i≠j, $$C_{p_A^i, p_A^j}(0) = C_{p_A^i, p_B^j}(0) = 0$$

$$C_{p_A^i, p_B^j}(0) = C_{p_A^i, p_B^j}(-1) = 0$$

$$C_{p_B^i, p_A^j}(0) = C_{p_B^i, p_A^j}(1) = 0 \quad (3.2)$$

Thus, when $p_A^i$ and $p_A^j$ are from different members of the set, the cross-correlation of sign sequences $p_A^i$ with the sign sequence $p_A^j$ is zero at lag=0, and when $p_B^i$ and $p_B^j$ are from different members of the set, the cross-correlation of sign sequences $p_B^i$ with the sign sequence $p_B^j$ is zero at lag=0.

In addition, when $p_A^i$ and $p_B^j$ are from different members of the set, the cross-correlation of sign sequences $p_A^i$ with the sign sequence $p_B^i$ is zero at lag=0 and lag=−1, while the cross-correlation of $p_B^j$ with $p_A^i$ is zero at lag=0 and lag=1.

Additional properties of a ZCZ CCP sequence set constructed based the first condition, (3.1), and the second condition, (3.2), are described below.

Firstly, a new sign sequence set obtained by changing the signs of any arbitrary sequence(s) in $\{p^i\}$ will satisfy the first and second conditions, (3.1) and (3.2).

Secondly, a new sign sequence set obtained by changing the signs of any arbitrary sequence $\{p_A^i\}$ or $\{p_B^i\}$ will satisfy the first and second conditions, (3.1) and (3.2).

Thirdly, a new sign sequence set obtained by circularly shifting all sequences in $\{p^i\}$ shall satisfy the first and second conditions, (3.1) and (3.2).

ZCZ CCP sequences may be found by performing a computer search for sequences that satisfy the first and second conditions, (3.1) and (3.2). However, this method is inefficient when L is relatively large.

In accordance with one aspect of the present disclosure, ZCZ CCP sequences are constructed using a recursive method.

The recursive expansion operations start from a set of ZCZ ($N \times L_0, N, N, M_0$) CCP sequences, which is represented by the following $M_0 \times L_0$ matrix $P^{(0)}$ $$P^{(0)} = \begin{bmatrix} P_{11}^{(0)} & P_{12}^{(0)} \\ P_{21}^{(0)} & P_{22}^{(0)} \end{bmatrix} \quad (3.3)$$

where $P_{mn}^{(0)}$ is an $$\frac{M_0}{2} \times \frac{L_0}{2}$$

sub-matrix or $p^{(0)}$, $m, n \in \{1, 2\}$. The superposed zero denotes an iteration number. Here it is assumed that $M_0$ is an even number and $L_0$ is a multiple of 4. Each row is the sign sequence of a CCP sequence, so each row satisfies autocorrelation requirement of equation (3.1) and any arbitrary two rows satisfy cross-correlation requirement of equation (3.2). The matrix of signs at iteration w is written as $$P^{(w)} = \begin{bmatrix} P_{11}^{(w)} & P_{12}^{(w)} \\ P_{21}^{(w)} & P_{22}^{(w)} \end{bmatrix}. \quad (3.4)$$

A new set of ZCZ $(2^{w+1} N \cdot L_0, N, N, 2^{w+1} M_0)$ CCP sequences, can be constructed recursively as below:

$$P^{(w+1)} = \begin{bmatrix} E \otimes P_{11}^{(w)} & E \otimes P_{12}^{(w)} \\ E \otimes P_{21}^{(w)} & E \otimes P_{22}^{(w)} \end{bmatrix} \quad (3.5)$$

where $$E = \begin{bmatrix} +1 & +1 \\ +1 & -1 \end{bmatrix},$$

which is an Hadamard matrix of order 2 for matrix expansion, $\otimes$ represents the Kronecker tensor product operator and $w = 0, 1, 2, \ldots$.

In order to guarantee that the first condition (3.1) is satisfied after the recursion operation, each starting ZCZ CCP sign sequence $p^i$ in $P^{(0)}$ satisfies a third condition:

Condition III:

$$p_0^i \cdot p_{L_0/2}^i = -p_{L_0/2-1}^i \cdot p_{L_0-1}^i \quad (3.6a)$$

or, equivalently, $$p_{A,0}^i \cdot p_{A,L_0/4}^i = -p_{B,L_0/4-1}^i \cdot p_{B,L_0/2-1}^i \quad (3.6b)$$

for all sign sequences in the set.

In addition, in order to guarantee that the second condition is satisfied after the recursion operation, all start ZCZ CCP sequences $p^i$ in $P^{(0)}$ satisfy a fourth condition:

Condition IV:

either $p_0^i = p_{L_0/2-1}^i$ and $p_{L_0/2}^i = -p_{L_0-1}^i$ for all start sequences or $p_0^i = -p_{L_0/2-1}^i$ and $p_{L_0/2}^i = p_{L_0-1}^i$ for all start sequences $\quad (3.7a)$ or, equivalently, either $p_{A,0}^i = p_{B,L_0/4-1}^i$ and $p_{A,L_0/4}^i = -p_{B,L_0/2-1}^i$ for all start sequences or $p_{A,0}^i = -p_{B,L_0/4-1}^i$ and $p_{A,L_0/4}^i = p_{B,L_0/2-1}^i$ for all start sequences $\quad (3.7b)$ Note that, since the product $E \otimes P_{mn}^{(w)}$ generates a copy of $P_{mn}^{(w)}$ or a copy of $-P_{mn}^{(w)}$, the operations in (3.5) guarantee that first element of equation (3.2) is satisfied after recursions.

Thus, a set of Zero-Correlation-Zone (ZCZ) Concatenated Complementary Pair (CCP) sequences of length L×N with zero-correlation-zone range of at least one may be constructed by selecting sequences A and B of length N that form a complementary pair, selecting an initial set of sign sequences $p_A^{(w)}$ and $p_B^{(w)}$ of length L/4 (the odd and even parts of $p^{(w)}$ having length L), interleaving and concatenating the initial set of sign sequences $p_A^{(w)}$ and $p_B^{(w)}$ to generate sign sequences $p_A^{(w+1)}$ and $p_B^{(w+1)}$ of length L/2 and, for each member of the set of ZCZ CCP sequences, combining the sign sequences $p_A^{(w+1)}$ and $p_B^{(w+1)}$ with the complementary pair sequences A and B to form the member ZCZ CCP sequence.

As a first example we consider the ZCZ (8N,N,N,2) CCP sequences with sign sequences $$P^{(0)} = \begin{pmatrix} p^1 \\ p^2 \end{pmatrix} = \begin{pmatrix} +, & -, & -, & -, & -, & -, & -, & - \\ -, & +, & -, & -, & +, & +, & -, & - \end{pmatrix}. \quad (3.8)$$

Equivalents, $p_A^1 = (+,+,-,-)$, $p_B^1 = (-,-,-,-)$, $p_A^2 = (-,+,+,-)$, and $p_B^2 = (+,-,+,-)$. Expanding (3.8) using equation (3.5) yields larger sets of CCP sequences. A single application of the expansion operation produces the set of (16N,N,N,4) CCP sequences in (3.9).

$$\begin{array}{cccccccccccccccc}
1 & -1 & 1 & -1 & 1 & -1 & 1 & -1 & -1 & -1 & -1 & -1 & -1 & -1 & -1 \\
1 & -1 & 1 & -1 & -1 & 1 & -1 & 1 & -1 & -1 & -1 & -1 & 1 & 1 & 1 & 1
\end{array} \quad (3.9)$$

-continued

```
-1  1  1 -1 -1  1  1 -1  1  1 -1 -1  1  1 -1 -1
-1  1  1 -1  1 -1 -1  1  1  1 -1 -1 -1 -1  1  1
```

Some sets of sign sequences that may be used as a basis for expansion are given in Table 1, below.

TABLE 1

Expandable sign sequences ZCZ (8N, N, N, 2) CCP sequences.

| set # | ZCZ sets |   |   |   |   |   |   |   |
|---|---|---|---|---|---|---|---|---|
| 1  | -1 | -1 | -1 | -1 | -1 |  1 | -1 |  1 |
|    | -1 | -1 |  1 |  1 | -1 |  1 |  1 | -1 |
| 2  | -1 | -1 | -1 | -1 | -1 |  1 | -1 |  1 |
|    | -1 |  1 |  1 | -1 | -1 | -1 |  1 |  1 |
| 3  | -1 | -1 | -1 | -1 |  1 | -1 |  1 | -1 |
|    | -1 | -1 |  1 |  1 |  1 | -1 | -1 |  1 |
| 4  | -1 | -1 | -1 | -1 |  1 | -1 |  1 | -1 |
|    | -1 |  1 |  1 | -1 |  1 |  1 | -1 | -1 |
| 5  | -1 | -1 | -1 |  1 | -1 |  1 | -1 | -1 |
|    | -1 | -1 |  1 | -1 | -1 |  1 |  1 |  1 |
| 6  | -1 | -1 | -1 |  1 | -1 |  1 | -1 | -1 |
|    | -1 |  1 |  1 |  1 | -1 | -1 |  1 | -1 |
| 7  | -1 | -1 | -1 |  1 |  1 | -1 |  1 |  1 |
|    | -1 | -1 |  1 | -1 |  1 | -1 | -1 | -1 |
| 8  | -1 | -1 | -1 |  1 |  1 | -1 |  1 |  1 |
|    | -1 |  1 |  1 |  1 |  1 |  1 | -1 |  1 |
| 9  | -1 | -1 |  1 | -1 | -1 |  1 |  1 |  1 |
|    | -1 |  1 | -1 | -1 | -1 | -1 |  1 | -1 |
| 10 | -1 | -1 |  1 | -1 |  1 | -1 | -1 |  1 |
|    | -1 |  1 | -1 | -1 |  1 |  1 | -1 | -1 |
| 11 | -1 | -1 |  1 |  1 | -1 |  1 |  1 | -1 |
|    | -1 |  1 | -1 |  1 | -1 | -1 | -1 |  1 |
| 12 | -1 | -1 |  1 |  1 |  1 | -1 | -1 |  1 |
|    | -1 |  1 | -1 |  1 |  1 |  1 |  1 | -1 |
| 13 | -1 |  1 | -1 | -1 | -1 |  1 | -1 |  1 |
|    | -1 |  1 |  1 |  1 | -1 | -1 |  1 | -1 |
| 14 | -1 |  1 | -1 | -1 |  1 |  1 |  1 | -1 |
|    | -1 |  1 |  1 |  1 |  1 |  1 | -1 |  1 |
| 15 | -1 |  1 |  1 | -1 | -1 | -1 | -1 | -1 |
|    | -1 |  1 |  1 | -1 | -1 | -1 |  1 |  1 |
| 16 | -1 |  1 | -1 |  1 |  1 |  1 |  1 |  1 |
|    | -1 |  1 |  1 | -1 |  1 |  1 | -1 | -1 |

The sequences disclosed herein have utility in a wide range of applications. Such applications include information transmission and system identification, for example. In particular, the sequences listed in (3.8) have the potential to replace the existing sequences used as the CEF in IEEE 802.11ad. Use of the sequences in (3.8) would provide better PHY type detection performance.

An example of a sign sequences found by a computer search for (8N,N,N,2) CCP sequences (L=8) are the sign sequences:

$$p^1=(+,-,+,-,-,-,-,-)$$

$$p^2=(-,+,+,-,+,+,-,-). \quad (3.10)$$

FIG. 12 shows the new CEF fields proposed, analogous to the CEF for IEEE 802.11ad, generated using the sign sequences in equation (3.10). FIG. 12A shows an exemplary CEF field 522″ for SC packets, while FIG. 12B shows an exemplary CEF field 522‴ for OFDM packets. These sequences are (8×128,128,128,2) ZCZ CCP sequences, since each sequence uses 8 concatenated CCP blocks of length 128, yielding a zero correlation zone of from −128 to 128. There are two sequences in the set. The cross-correlation property of these sequences can result in an optimal sequence detection when the delay of channel taps is within the range of zero correlation zone.

FIG. 4 and FIG. 11, discussed above, show the results of using these ZCZ CCP sequences for PHY type detection when the channel has a single propagation path and when the channel has multiple propagation paths, respectively. In both cases, the cross-correlation is smaller when ZCZ sequences are used than when the sequences defined in IEEE 802.11ad are used. These examples demonstrates that a CEF using the disclosed ZCZ sequences can improve the peak detection performance in IEEE 802.11ad by increasing the difference between the peak values of channel estimates $h_{SC}(n)$ and $h_{OFDM}(n)$ for both single path and multipath channels.

Currently, only two $ZCZ^0$ CCP sequences are proposed in IEEE 802.11ad for blind detection of the PHY types (either SC or OFDM). The use of more than two $ZCZ^0$ sequences in a sequence set has the potential to carry additional information.

The difference between ZCZ sequences and $ZCZ^0$ sequences is an additional requirement on cross-correlation. Condition I (equation 3.1) can also be applied to $ZCZ^0$ CCP sequences to ensure that the autocorrelation of $S^i$ is a delta function for time lags in the range $[-N,N]$. To meet the cross-correlation requirement for $ZCZ^0$ sequences, it is necessary and sufficient that the sign sequences satisfy a fifth condition.

Condition V:

$$C_{p^i,p^j}(0)=0, \quad (3.10a)$$

or, equivalently, $$C_{p_A^i,p_A^j}(0)+C_{p_B^i,p_B^j}(0)=0, \quad (3.10b)$$

for all sign sequences $p_i$ and $p_j$ in the set. Together, conditions (3.1) and (3.10a) or (3.10b) can be used to search for $ZCZ^0$ sequences.

$ZCZ^0$ sequences can also be constructed recursively when condition III (equation 3.6) is satisfied for each row of the initial CCP sequence set, $p^{(o)}$. It is noted that Kronecker products $E \otimes P_{mn}^{(w)}$ do not have any impact on the cross-correlation at zero shift between any two generated sequences.

Similarly, a $(2^{w+1}N \cdot L_0, N, 0, 2^{w+1}M_0)$ CCP sequence set can be constructed with a $(2^w N \cdot L_0, N, 0, 2^w M_0)$ CCP sequence set.

A computer search for values of L being a multiple of 4 and up to 20 was implemented to find $ZCZ^0$ CCP sequence sets with M=L members. Table 2 lists the number of sets with M=L found.

TABLE 2

Search results for $ZCZ^0$ CCP sequence sets

| L | Number of available $ZCZ^0$ CCP seq. sets when M = L | Number of sequences satisfying equation (3.1) |
|---|---|---|
| 4  | 8   | 8       |
| 8  | 34  | 72      |
| 12 | 18  | 800     |
| 16 | 369 | 9,800   |
| 20 | 1   | 127,008 |

It can be verified that the following sign sequence set $p^{(o)}$ represents a set of (4N,N,0,4) CCP sequences and satisfies Conditions I (equation 3.1) and V (equation 3.10)

$$P^{(0)} = \begin{bmatrix} - & - & - & + \\ - & - & + & - \\ - & + & - & - \\ + & - & - & - \end{bmatrix}. \quad (3.11)$$

Applying $P^{(0)}$ above to (3.5) yields the expanded matrix $$P^{(1)} = \begin{bmatrix} - & - & - & - & - & + & - & + \\ - & - & - & - & + & - & + & - \\ - & - & + & + & - & + & + & - \\ - & - & + & + & + & - & - & + \\ - & + & - & + & & & & \\ + & - & + & - & - & - & - & - \\ - & + & + & - & - & - & + & + \\ + & - & - & + & - & - & + & + \end{bmatrix}. \quad (3.12)$$

It can be shown that $P^{(1)}$ represents a set of (8N,N,0,8) CCP sequences.

For each set member, the sign sequences $p_A$ and $p_B$ are obtained by selecting the odd and even elements of a row of the matrix in equation (3.12).

Thus, expanded sign sequences $p_A$ and $p_B$ can be constructed by selecting an initial set of sign sequences, and then interleaving and concatenating the initial set of sign sequences $p_A$ and $p_B$ to double the length of the sign sequences $p_A$ and $p_B$ and double the number of sign sequences in the set.

The initial set of sign sequences may be obtained by interleaving elements of the initial set of sign sequences $p_A$ and $p_B$ to form a sign matrix $$P^{(w)} = \begin{bmatrix} P^{(w)}_{11} & P^{(w)}_{12} \\ P^{(w)}_{21} & P^{(w)}_{22} \end{bmatrix}$$

and then expanding the sign matrix by calculating a Kronecker product of the Hadamard matrix $$E = \begin{bmatrix} -1 & +1 \\ -1 & -1 \end{bmatrix}$$

with sub-matrices of the sign matrix to forming an expanded sign matrix as $$P^{(w+1)} = \begin{bmatrix} E \otimes P^{(w)}_{11} & E \otimes P^{(w)}_{12} \\ E \otimes P^{(w)}_{21} & E \otimes P^{(w)}_{22} \end{bmatrix},$$

where $\otimes$ represents a Kronecker tensor product operation.

Alternatively, the sign sequences $p_A$ and $p_B$ may be found by searching a plurality of sign sequences of length L/2 and identifying a set of sign sequences which satisfy Conditions I and V.

Further expansion of the sequence set. Once a set of (N×L, N,N,M) ZCZ CCP sequences $\{S_1^i\}$ has been constructed, where $$S_1^i = \{p_0^i A, p_1^i B, p_2^i A, \ldots, p_{L-2}^i A, p_{L-1}^i B\},$$
$$i = 0, 1, \ldots, M-1 \quad (4.1)$$

where $\{p^i\}$ is a sign sequence set and A and B are a pair of real complementary sequences A and B of length N. Define a pair of complementary sequences A and B as A~B. Let $\overline{A}$ and $\overline{B}$ be the sequences obtained by reversing the symbol order in sequences A and B respectively, and let −A and −B be the sequences obtained by multiplying each symbol in A and B with −1 respectively.

It can be shown that complementary pairs have the following properties:

1) there exists complementary pairs $\overline{A}$ ~B or A~$\overline{B}$ or $\overline{A}$ ~ $\overline{B}$ .

2) there exists complementary pairs (−A)~B or A~(−B) or (−A)~(−B).

3) two complementary sequences are interchangeable.

Another set of (N×L,N,N,M) ZCZ CCP sequences $\{S_2^i\}$ can be constructed by using the same sign sequence set $\{p^i\}$ as given above and another pair of complementary sequences $(-\overline{A})$ and $\overline{B}$ or $\overline{A}$ and $(-\overline{B})$ so that $$S_2^i = \pm \{p_0^i(-\overline{B}), p_1^i \overline{A}, p_2^i(-\overline{B}), \ldots, p_{L-2}^i(-\overline{B}),$$
$$p_{L-1}^i \overline{A}\}, i = 0, 1, \ldots, M-1 \quad (4.2)$$

It can be shown that a larger ZCZ CCP sequence set, which is composed of both ZCZ CCP sequence sets $\{S_1^i\}$ and $\{S_2^i\}$, i.e., $\{F_k\} = \{S_1^i, S_2^i\}$, for k=0, 1, . . . , 2M−1 and for i=0, 1, . . . , M−1, can be constructed to generate a (N×L,N,N,2M) ZCZ CCP sequence set. The sequence set $\{F_k\}$ preserves the sequence length and the range of zero-correlation zone, as in $\{S_1^i\}$ or $\{S_2^i\}$, but doubles the number of sequences in the sequence set $\{S_1^i\}$ or $\{S_2^i\}$.

Note that the expansion method described above for real ZCZ CCP sequences can also be further extended to generate complex ZCZ CCP sequences where A and B are a pair of complex complementary sequences in a ZCZ CCP sequence set $\{S_1^i\}$ and another pair of complex complementary sequences is $(-\overline{A}^*)$ and $\overline{B}^*$ or $(\overline{A}^*)$ and $(-\overline{B}^*)$, which are used in another ZCZ CCP sequence set $\{S_2^i\}$. Properties 2) and 3) above can also be applied directly to complex complementary sequences. Extending Property 1) above to complex complementary sequences gives the sequence pairs $\overline{A}^* \sim \overline{B}$ , or A~$\overline{B}^*$ or $\overline{A}^* \sim \overline{B}^*$, where the superposed star denotes the complex conjugate.

Using the relation $$C_{A(-\overline{B}^*),}{}^a(k) + C_{B}{}_*{}^a(k) = 0, \text{ for } k = [-(N-1),(N-1)] \quad (4.3)$$

it can be shown that $\{F_k\} \square \{S_1^i, S_2^i\}$ for k=0, 1, . . . , 2M−1 and for i=0, 1, . . . , M−1 is a complex (N×L,N,N,2M) ZCZ CCP sequence set where $$S_1^i = \{p_0^i A, p_1^i B, p_2^i A, \ldots, p_{L-2}^i A, p_{L-1}^i B\}, i=0, 1, \ldots,$$
$$M-1 \quad (4.4)$$

and $$S_2^i = \pm \{p_0^i(-\overline{B}^*), p_1^i \overline{A}^*, p_2^i(-\equiv^*), \ldots, p_{L-2}^i(-$$
$$\overline{B}^*), p_{L-1}^i \overline{A}^*\}, i=0, 1, \ldots, M-1 \quad (4.5)$$

are complex (N×L,N,N,M) ZCZ CCP sequence sets.

It is noted that equation (4.5) is a generalization of equation (4.2), since for real sequences A=A* and B=B*.

ZCZ CCP sequences have a variety of applications. For example, the sequences may be used as training sequences that carry multiple state information to a single user, as training sequences used for distinguishing and channel-estimation for uplink (UL) multiple users, or as training sequences used for downlink (DL) inter-cell interference mitigation and cell identification.

Figure 13:
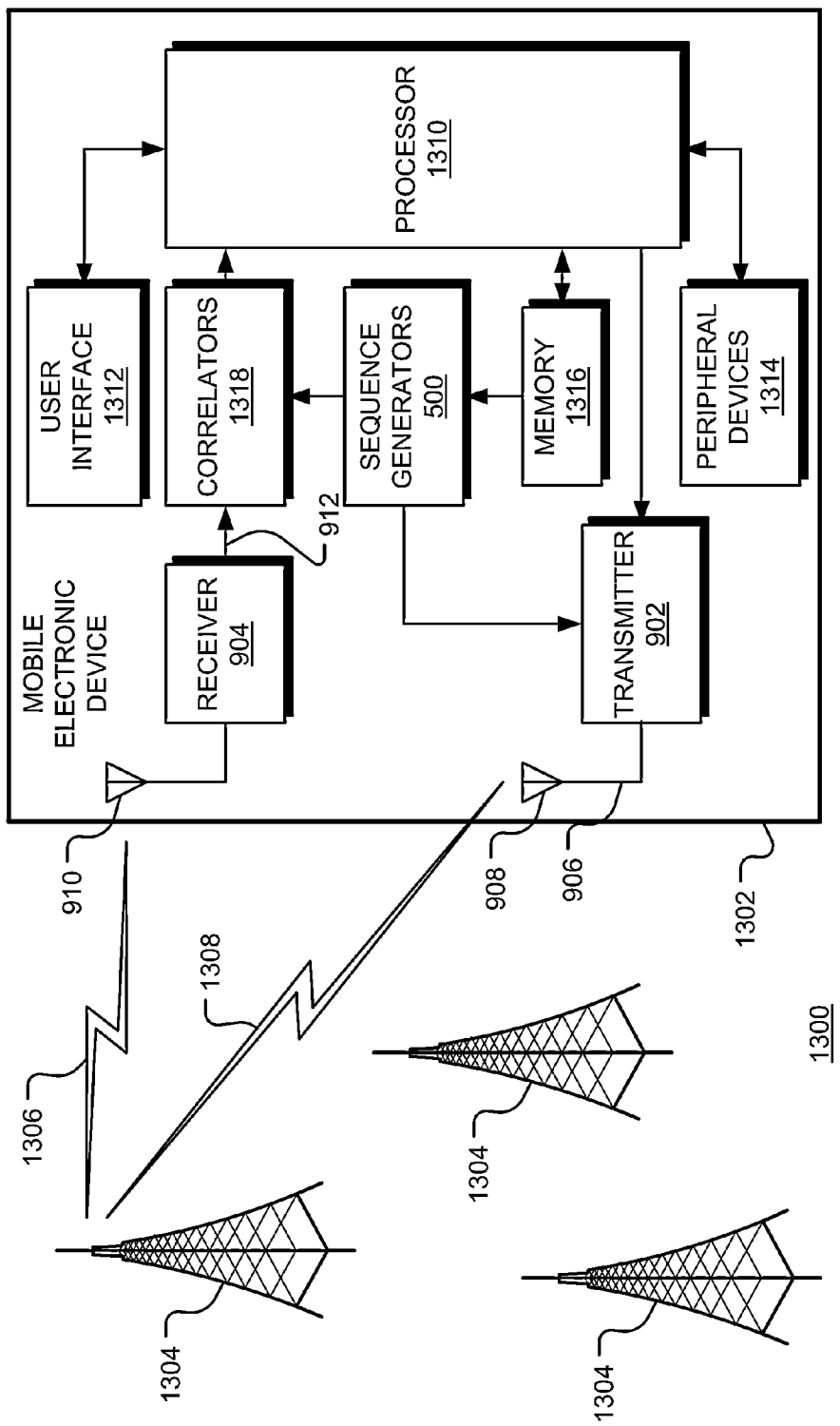
FIG. 13 is a block diagram of a communication system, in accordance with exemplary embodiments of the disclosure.

FIG. 13 is a block diagram of a communication system 1300, in accordance with exemplary embodiments of the disclosure. The communication system 1300 comprises a mobile electronic device 1302, such as mobile telephone, PDA, tablet computer, notebook computer or handheld electronic device, for example. Transmitter 902 of the mobile electronic device 1302 communicates with a base station communication tower 1304 of a network via antenna 908 and outgoing propagation path 1308. Receiver 904 of the mobile electronic device 1302 communicates a base station communication tower 1304 via incoming propagation path 1306 and antenna 910. The mobile electronic device 1302 includes a processor 1310 that is operatively coupled to a user interface 1312 and to peripheral devices 1314. The user interface 1312 may include a display, a keyboard, a microphone, a loudspeaker, a motion sensor, an orientation sensor, a motion generator, a touch device and/or other user controls. The peripheral devices 1314 may include a SIM card, a battery, input/output ports, a near field communication port, a flash memory interface, and other devices. Memory 1316 provides data and program memory for the processor 1310, and, optionally, sequence generators 500. For example, the memory 1316 may include a non-transient memory for storing the complete sequences, for storing the complementary pair sub-sequences, A and B, and/or the sign sequences applied to the complementary pair sub-sequences. In operation, a signal frame of outgoing signal 906 includes a training sequence generated by sequence generator 500. An incoming signal 912 is passed to a set of correlators 1318 where it is correlated with sequences generated by the sequence generators 500 to enable type detection or channel impulse response estimation.

Figure 14:
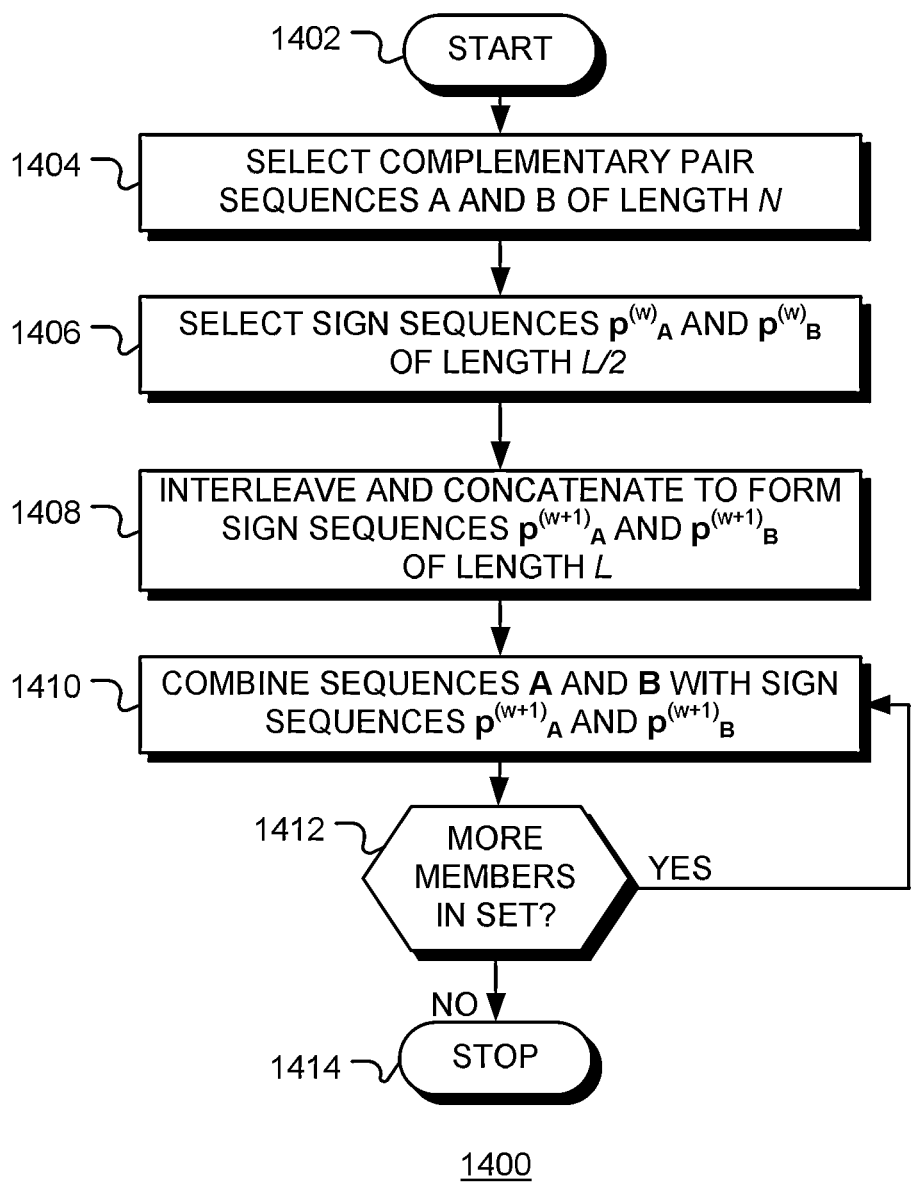
FIG 14 is a flow chart of a method for constructing a set of Zero-Correlation-Zone (ZCZ) Concatenated Complementary Pair (CCP) sequences, in accordance with exemplary embodiments of the disclosure.

FIG. 14 is a flow chart 1400 of a method for constructing a set of Zero-Correlation-Zone (ZCZ) Concatenated Complementary Pair (CCP) sequences of length 2L×N with zero-correlation-zone range equal to one and set size greater than two, for use in a transceiver of a communication system, in accordance with an exemplary embodiment of the disclosure. Following start block 1402, sequences A and B of length N that form a complementary pair are selected at block 1404. At block 1406, an initial set of sign sequences $p_A^{(w)}$ and $p_B^{(w)}$ of length L/2 is selected. At block 1408, the initial set of sign sequences $p_A^{(w)}$ and $p_B^{(w)}$ are interleaved and concatenated to generate sign sequences $p_A^{(w+1)}$ and $p_B^{(w+1)}$ of length L. At block 1410, for a member of the set of ZCZ CCP sequences, the sign sequences $p_A^{(w+1)}$ and $p_B^{(w+1)}$ are combined with the complementary pair sequences A and B, respectively, to form the member ZCZ CCP sequence. If there are more members in the set, as depicted by the positive branch from decision block 1412, flow returns to block 1410, so that block 1412 is performed for each member of the set of ZCZ CCP sequences. Once all members of the set of sequences have been constructed, as depicted by the negative branch from decision block 1412, the method terminates at block 1414. One or more sequences of the set of ZCZ CCP sequences may be selected to be used in the transceiver of the communication system.

In one embodiment, the sign sequence $p_A^{(w)}$ is uncorrelated with the sign sequence $p_B^{(w)}$ at lag=0 and at lag=−1, and the elements of the sign sequences $p_A^{(w)}$ and $p_B^{(w)}$ satisfy the condition $p_{A,0}^{(w)} \cdot p_{A,L/4}^{(w)} = -p_{B,L/4-1}^{(w)} \cdot p_{B,L/2-1}^{(w)}$.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for constructing a set of sequences for use in a transceiver of a communication system, the method comprising:
   selecting sequences A and B of length N that form a complementary pair; and
   for each member i of a set of sequences:
      selecting a pair of sign sequences $p_A^i$ and $p_B^i$ of length L/2 and
      combining the pair of sign sequences $p_A^i$ and $p_B^i$ with the complementary pair sequences A and B, respectively, to form the member i sequence;
   selecting one or more sequences of the set of sequences for use in the transceiver of the communication system, and
   storing the one or more sequences in a memory of the transceiver,
   where the pairs of sign sequences $p_A^i$ and $p_B^i$ are selected such that the set of sequences comprises a set of Zero-Correlation-Zone (ZCZ) Concatenated Complementary Pair (CCP) sequences, of length L×N with zero-correlation-zone range greater than one, and where the ZCZ CCP sequences facilitate communication.

2. The method of claim 1, where the pairs of sign sequences are selected such that the cross correlations between the member i sign sequence $p_A^i$ of the set of ZCZ CCP sequences and a member j sign sequence $p_B^j$ are zero at lag=0 and at least one of lag=1 and lag=−1 for each member i and member j of the set of ZCZ CCP sequences.

3. The method of claim 1, where combining the sign sequences $p_A^i$ and $p_B^i$ with the complementary pair sequences A and B comprises:
   forming a first Kronecker tensor product $p_A^i \otimes A$ and a second Kronecker tensor product $p_B^i \otimes B$; and
   interleaving blocks of length N of the first and second Kronecker tensor products.

4. The method of claim 1, where combining the sign sequences $p_A^i$ and $p_B^i$ with the complementary pair sequences A and B comprises:
   modulating the sequence A by a sign of the sign sequence $p_A^i$ for each sign of the sign sequence $p_A^i$;
   modulating the sequence B by a sign of the sign sequence $p_B^i$ for each sign of the sign sequence $p_B^i$; and
   interleaving the sign modulated sequence A with the sign modulated sequence B in blocks of length of N.

5. The method of claim 1, where combining the sign sequences $p_A^i$ and $p_B^i$ with the complementary pair sequences A and B comprises:
   alternately concatenating the complementary pair sequence A, modulated by a sign of the sign sequence $p_A$, and the complementary pair sequence B, modulated by a sign of the sign sequence $p_A$.

6. The method of claim 1, where the sequence A and the sequence B are binary Golay complementary sequences.

7. The method of claim 1, where the transceiver comprises a transmitter of a mobile electronic device, the method further comprising:
   transmitting the one or more sequences from the transmitter of the mobile electronic device.

8. The method of claim 1, where the transceiver comprises a receiver of a mobile electronic device, the method further comprising:
   receiving in the receiver of the mobile electronic device a sequence transmitted over a communication channel; and
   correlating the received sequence with the one or more sequences.

9. A method for constructing a set of sequences for use in a transceiver of a communication system, the method comprising:
   selecting sequences A and B of length N that form a complementary pair; and
   for each member i of a set of sequences:
      selecting a pair of sign sequences $p_A^i$ and $p_B^i$ of length L/2 and
      combining the pair of sign sequences $p_A^i$ and $p_B^i$ with the complementary pair sequences A and B, respectively, to form the member i sequence; and
   selecting one or more sequences of the set of sequences for use in the transceiver of the communication system,
   where the pairs of sign sequences $p_A^i$ and $p_B^i$ are selected such that the set of sequences comprises a set of Zero-Correlation-Zone (ZCZ) Concatenated Complementary Pair (CCP) sequences, of length L×N with zero-correlation-zone range greater than one, and where the ZCZ CCP sequences facilitate communication,
   where:
      the pair of sign sequences $p_A^i$ and $p_B^i$ for set member i of the set of sequences satisfy a first condition that:
         the sign sequence $p_A^i$ is uncorrelated with the sign sequence $p_B^i$ at lag=0 and at lag=−1; and
      the sign sequences $p_A^i$ and $p_B^j$, for set member i and different set member j, satisfy a second condition that:
         the cross-correlation of the sign sequence $p_A^i$ with the sign sequence $p_A^j$ is zero at lag=0,
         the cross-correlation of the sign sequence $p_B^i$ with the sign sequence $hd j^B$ is zero at lag=0,
         the cross-correlation of the sign sequence $p_A^i$ with the sign sequence $p_B^j$ is zero at lag=0 and lag=−1, and
         the cross-correlation of the sign sequence $p_B^i$ with the sign sequence $p_A^j$ is zero at lag=0 and lag=1.

10. The method of claim 9, where selecting sign sequences $p_A^i$ and $p_B^i$ comprises:
   searching a plurality of sign sequences of length L/2; and
   identifying a set of sign sequences for which:
      for each set member i of the set of sequences, the pair of sign sequences $p_A^i$ and $p_B^i$ satisfy the first condition; and
      for each pair of set members i and j, i≠j, the sign sequences $p_A^i$, $p_B^i$, $p_A^j$ and $p_B^j$ satisfy the second condition.

11. A transceiver implemented method for transmitting information over a communication channel in a training sequence for estimating properties of the communication channel, the method comprising:
   retrieving sequences A and B that form a complementary pair from a memory of the transceiver;
   selecting a pair of sign sequences $p_A^i$ and $p_B^i$ from a set of pairs of sign sequences dependent upon the information to be transmitted;
   combining the sign sequences $p_A^{i\ and\ }p_B^i$ with the complementary pair sequences A and B, respectively, to form a zero correlation zone (ZCZ) concatenated complementary pair (CCP) sequence; and
   transmitting ZCZ CCP sequence as the training sequence,
   where the pairs of sign sequences are configured such that their combination with complementary pair sequences A and B form a set of ZCZ CCP sequences that facilitate communication, and
   where combining the sign sequences $p_A^i$ and $p_B^i$ with the complementary pair sequences A and B comprises:
      alternately concatenating the complementary pair sequence A, modulated by a sign of the sign sequence $p_A$, and the complementary pair sequence B, modulated by a sign of the sign sequence $p_A$.

12. The method of claim 11, where the set of pairs of sign sequences comprises more than two pairs of sign sequences.

13. The method of claim 11, where the sum of the cross-correlation of the sign sequence $p_A^i$ with the sign sequence $p_{A_j}$ and the cross-correlation of the sign sequence $p_B^i$ with the sign sequence $p_B^j$ is equal to zero at lag=0 for sign sequences of a set member i and a different set member j.

14. The method of claim 11, where the zero-correlation-zone range is greater than one.

15. A receiver of a wireless communication system operable to identify a transmitted training sequence of a set of training sequences in a training sequence field in a signal frame that is propagated over a communication channel, the receiver comprising:
   a memory operable to store complementary pair sequences A and B, first sign sequence $p_A^{(1)}$ and second sign sequence $p_B^{(1)}$,
   a first zero correlation zone (ZCZ) Concatenated Complementary Pair (CCP) sequence generator, operable to generate a first ZCZ CCP sequence of a set of sequences having a zero correlation zone greater than one;
   a second ZCZ CCP sequence generator, operable to generate a second ZCZ CCP sequence of the set of sequences having a zero correlation zone greater than one;

a first correlator, operable to produce a first cross-correlation between the first ZCZ CCP sequence and the propagated signal frame;

a second correlator, operable to produce a second cross-correlation between the second ZCZ CCP sequence and the propagated signal frame; and a comparator, operable to identify the transmitted training sequence by comparing the first cross-correlation and the second cross-correlation, where the transmitted training sequence facilitates communication, and where the first ZCZ CCP sequence generator is operable to alternately combine the complementary pair sequence A with the first sign sequence $p_A^{(1)}$ and the complementary pair sequence B with the second sign sequence $p_A^{(1)}$ to generate the first ZCZ CCP sequence.

16. The receiver of claim 15, further comprising a memory operable to store the first and second ZCZ CCP sequences.

17. A receiver of a wireless communication system operable to identify a transmitted training sequence of a set of training sequences in a training sequence field in a signal frame that is propagated over a communication channel, the receiver comprising:

a first zero correlation zone (ZCZ) Concatenated Complementary Pair (CCP) sequence generator, operable to generate a first ZCZ CCP sequence of a set of sequences having a zero correlation zone greater than one;

a second ZCZ CCP sequence generator, operable to generate a second ZCZ CCP sequence of the set of sequences having a zero correlation zone greater than one;

a first correlator, operable to produce a first cross-correlation between the first ZCZ CCP sequence and the propagated signal frame;

a second correlator, operable to produce a second cross-correlation between the second ZCZ CCP sequence and the propagated signal frame; and a comparator, operable to identify the transmitted training sequence by comparing the first cross-correlation and the second cross-correlation, where the transmitted training sequence facilitates communication, where:
the first sequence comprises a plurality of concatenated sub-sequences, each sub-sequence being a sequence A of a complementary pair modulated by a sign of a first sign sequence $p_A^{(i)}$, concatenated with a sequence B of the complementary pair modulated by a sign of a second sign sequence $p_B^{(i)}$; and the second sequence comprises a plurality of concatenated sub-sequences, each sub-sequence being the sequence A of the complementary pair modulated by a sign of a third sign sequence $p_A^{(j)}$, concatenated with the sequence B of the complementary pair modulated by a sign of a fourth sign sequence $p_B^{(j)}$, where the first, second third and fourth sign sequences are found by performing a computerized search.

18. The receiver of claim 17, where
the first, second, third and fourth sign sequences satisfy a first condition that:
the first sign sequence $p_A^{(i)}$ is uncorrelated with the second sign sequence $p_B^{(i)}$ at lag 0 and at lag=−1; and
the third sign sequence $p_A^{(j)} p_A^{(j)}$ is uncorrelated with the fourth sign sequence $p_B^{(j)}$ at lag 0 and at lag=−1; and
the first, second, third and fourth sign sequences satisfy a second condition that:

the first sign sequence $p_A^{(i)}$ is uncorrelated with the third sign sequence $p_A^{(j)}$ at lag 0;
the second sign sequence $p_B^{(i)}$ is uncorrelated with the fourth sign sequence $p_B^{(j)}$ at lag 0;
the cross-correlation of the first sign sequence $p_A^{(i)}$ with the fourth sign sequence $p_B^{(j)}$ is zero at lag=0 and at lag=−1; and
the cross-correlation of the second sign sequence $p_B^{(i)}$ with the third sign sequence $p_A^{(j)}$ is zero at lag=0 and at lag=1.

19. The receiver of claim 17, where the complementary pair sequences A and B comprise Golay sequences.

20. A non-transitory computer-readable medium having computer-executable instructions that, when executed by a processor of a transceiver, cause the processor to:

receive a signal frame containing a training sequence;

generate a first Zero-Correlation-Zone (ZCZ), concatenated complementary pair (CCP) sequence comprising a plurality of concatenated sub-sequences, each sub-sequence being a sequence A of a complementary pair, modulated by a sign of a first sign sequence $p_A^{(1)}$, alternately concatenated with a sequence B of the complementary pair, modulated by a sign of a second sign sequence $p_B^{(1)}$;

generate a second ZCZ CCP sequence comprising a plurality of concatenated sub-sequences, each sub-sequence being the sequence A of the complementary pair, modulated by a sign of a third sign sequence $p_A^{(2)}$; concatenated with the sequence B of the complementary pair, modulated by a sign of a fourth sign sequence $p_B^{(2)}$;

produce a first cross-correlation between the first ZCZ CCP sequence and the training sequence;

produce a second cross-correlation between the second ZCZ CCP sequence and the training sequence; and identify the training sequence by comparing the first cross-correlation and the second cross-correlation where:
the first, second, third and fourth sign sequences satisfy a first condition that:
the first sign sequence $p_A^{(1)}$ is uncorrelated with the second sign sequence $p_B^{(1)}$ at lag 0 and at lag=−1, and
the third sign sequence $p_A^{(2)}$ is uncorrelated with the fourth sign sequence $p_B^{(2)}$ at lag 0 and at lag=−1; and
the first, second, third and fourth sign sequences satisfy a second condition that:
the first sign sequence $p_A^{(1)}$ is uncorrelated with the third sign sequence $p_A^{(2)}$ at lag 0;
the second sign sequence $p_B^{(1)}$ is uncorrelated with the fourth sign sequence $p_B^{(2)}$ at lag 0;
the cross-correlation of the first sign sequence $p_A^{(1)}$ with the fourth sign sequence $p_B^{(2)}$ is zero at lag=0 and at lag=−1; and
the cross-correlation of the second sign sequence $p_B^{(1)}$ with the third sign sequence $p_A^{(2)}$ is zero at lag=0 and at lag=−1.

21. The non-transitory computer-readable medium of claim 20, where the computer-executable instructions that, when executed by a processor, cause the processor to generate a first ZCZ CCP sequence comprise computer-executable instructions to access a first ZCZ CCP sequence stored in a memory.

22. The non-transitory computer-readable medium of claim 20, where the computer-executable instructions that, when executed by a processor, cause the processor to generate the first ZCZ CCP sequence, comprise computer-executable instructions to:

access the complementary pair sequences A and B, the first sign sequence $p_A^{(1)}$ and the second sign sequence $p_B^{(1)}$ stored in a memory; and alternately combine the complementary pair sequence A with the first sign sequence $p_A^{(1)}$, and the complementary pair sequence B with the second sign sequence $p_A^{(1)}$ to generate the first ZCZ CCP sequence.

* * * * *